July 26, 1932. H. A. PECK 1,869,223
ELECTRICALLY OPERATED WINDLASS AND THE LIKE
Original Filed July 11, 1928 3 Sheets-Sheet 1

Inventor:—
Herbert Allen Peck
by his Attorneys
Howson & Howson

July 26, 1932. H. A. PECK 1,869,223

ELECTRICALLY OPERATED WINDLASS AND THE LIKE

Original Filed July 11, 1928 3 Sheets-Sheet 3

Inventor:—
Herbert Allen Peck
by his Attorneys
Howson & Howson

Patented July 26, 1932

1,869,223

UNITED STATES PATENT OFFICE

HERBERT ALLEN PECK, OF GLENSIDE, PENNSYLVANIA, ASSIGNOR TO AMERICAN ENGINEERING COMPANY, OF PHILADELPHIA, PENNSYLVANIA, A CORPORATION OF PENNSYLVANIA

ELECTRICALLY-OPERATED WINDLASS AND THE LIKE

Application filed July 11, 1928, Serial No. 291,891. Renewed June 2, 1932.

This invention relates to improvements in electrically-operated windlasses and like machines, and the principal object of the invention is to provide mechanism of this general class primarily adapted for use on boats and under conditions where general appearance and compactness of form are important considerations.

To this general end, the invention contemplates the provision of an electrically-operated windlass, gypsey or like mechanism which shall be exceptionally compact in form so as to occupy a minimum of space.

Another specific object of the invention is to provide mechanism of the stated character in which the electric motor shall be enclosed in a water-proof housing.

The invention further contemplates the provision in a mechanism of the stated character of various mechanical and structural improvements and novel features, such for example as a convenient and novel form of locking gear for engaging or disengaging the wildcat which may form an element of the mechanism; a desirable type of internal brake including a novel form of toggle actuating lever; the provision in electrically-operated mechanism of the type mentioned of fixed gudgeons upon which are operatively mounted the horizontal type gypsey heads or wildcats; and novel transmission mechanism between the motor and the gypsey heads or wildcats.

The invention also resides in a desirable and novel form of housing which may be varied to suit the various conditions and requirements of the individual installation.

Figure 1:
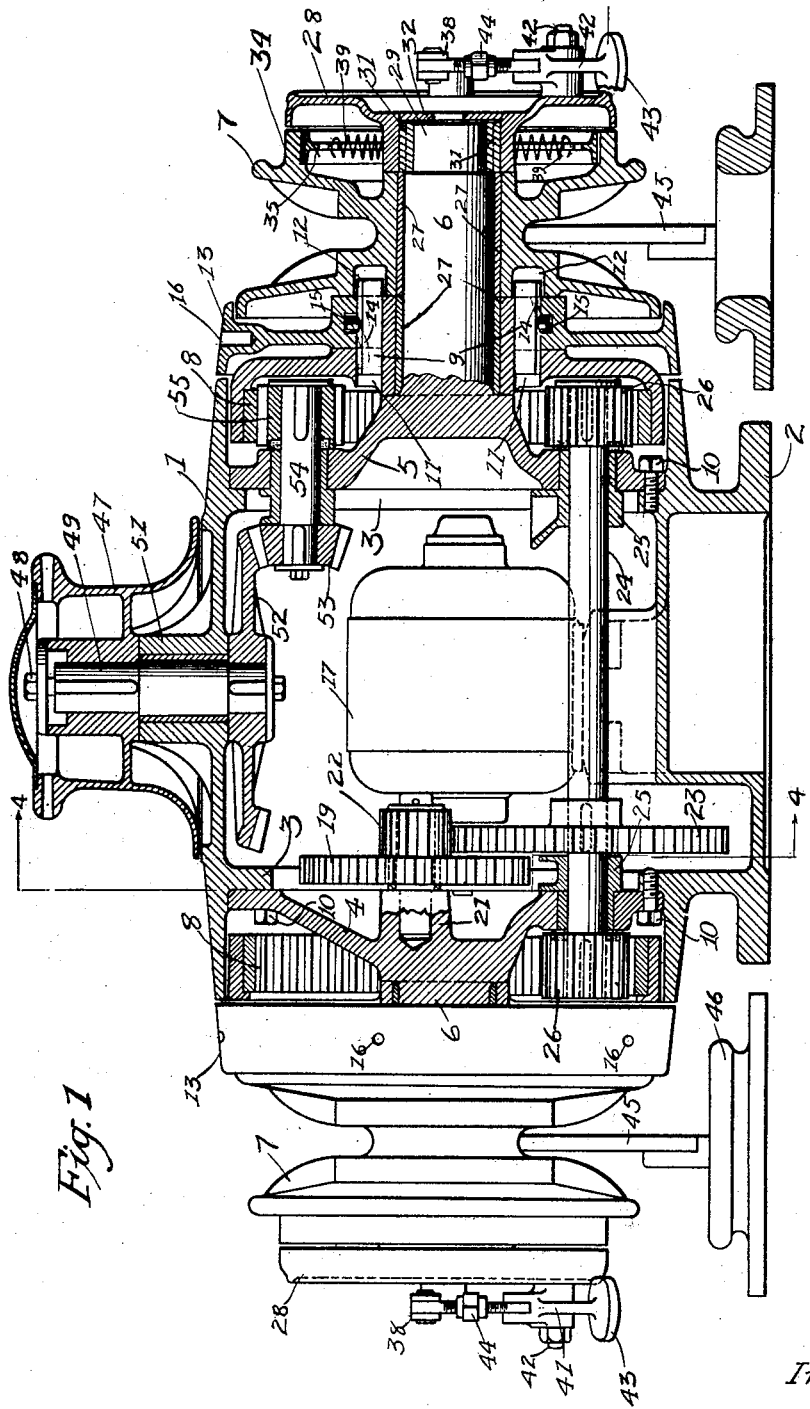
Figure 1 is a longitudinal sectional view and part true elevation showing a machine assembly made in accordance with the present invention.
Figure 2:
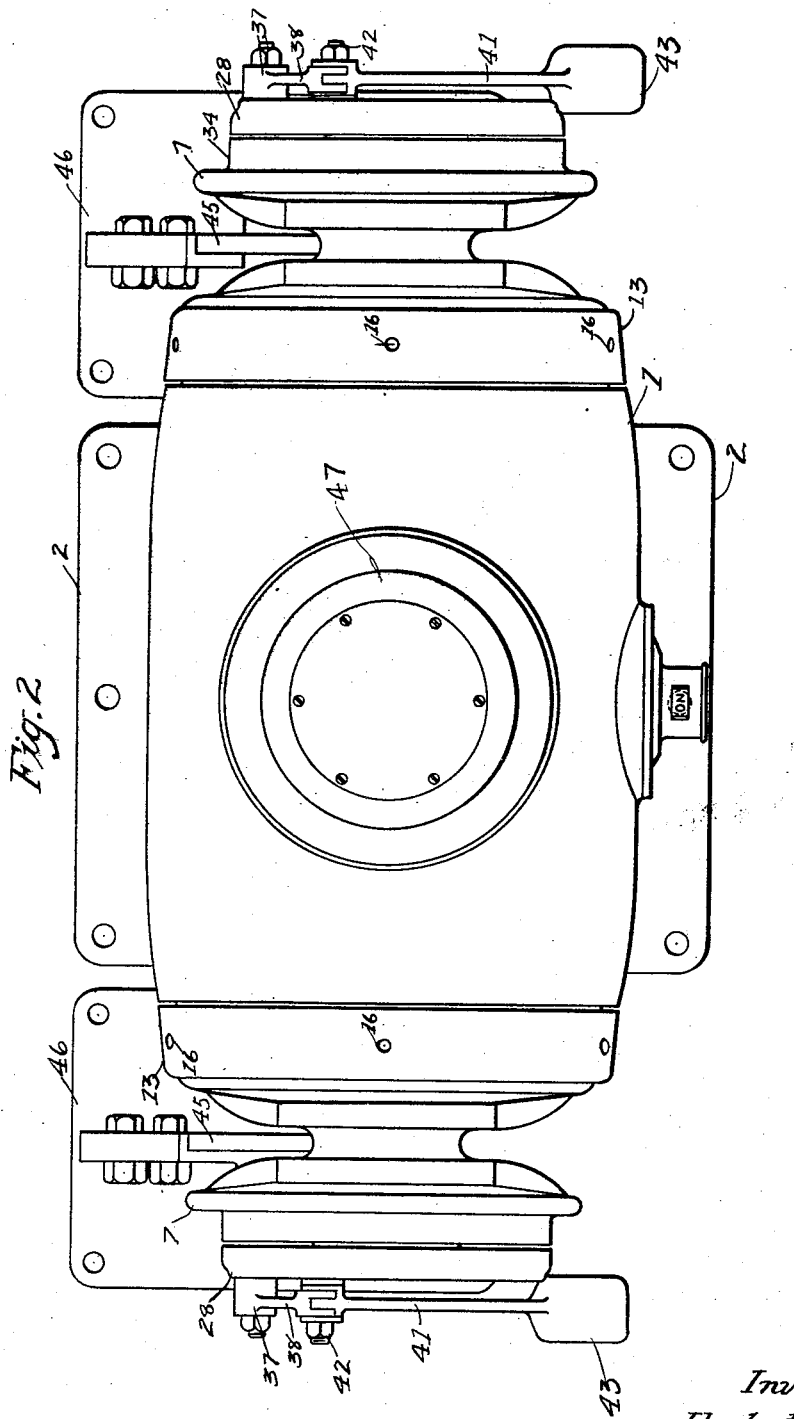
Fig. 2 is a plan view of the mechanism shown in Fig. 1.

With reference to the drawings, the machine in a preferred form comprises a compact substantially barrel-shaped housing 1 having at the bottom a suitable pedestal 2. On the inside and adjacent each end thereof the housing is provided with an inwardly extending annular flange 3, these flanges constituting a means for securing in position in the ends of the housing end plates, 4 and 5 respectively, which may be secured to the flanges 3 by means of bolts 10 or the like. Each of the end plates 4 and 5 is provided with an outwardly extending gudgeon 6 which in the illustrated embodiment of the invention constitute horizontal journals for wildcat heads 7. The gudgeons 6 in each instance also constitute a journal for a rotary internal gear 8 the hub of which extends outwardly into abutment with the side of the gypsey head 7.

An operative connection between the gears 8 and the associated wildcat heads is established in each instance through the medium of a pair of pins 9 mounted in axial passages 11 in the hub of the gear and adapted when projected beyond the outer face of the said hub to extend into suitably formed recesses 12 in the gypsey head. The pins 9, which in Fig. 1 are shown in position uniting the said gear and the wildcat head, may be retracted and again advanced through the medium of a rocking ring or disk 13 which is rotatably mounted upon the hub of the gear 8 and which has on its inner face cam grooves 14 adapted to receive projections 15 on the respective pins 9, as shown in Fig. 1. By rotating this locking disk in respect to the gear 8, which may be accomplished through the medium of a suitable lever inserted in radial apertures 16 in the periphery of the disks, the pins 9 may be shifted axially either to connect the gear with its associated wildcat head or to disconnect these parts.

In the interior of the housing 1 between the heads 4 and 5 is mounted an electric motor 17. The shaft of this motor carries a pinion 18 which meshes with a gear 19 journaled on a stud in an inwardly projecting boss 21 on the inner face of the head 4. Connected with the gear 19 is a pinion 22 which meshes with a gear 23 secured to a horizontal shaft 24 journaled in bearings 25, 25 in the heads 4 and 5. Each of the outer ends of the shaft 24 exteriorly of the heads 4 and 5 carries a pinion 26 which respectively mesh with the internal gears 8, as illustrated in Fig. 1. It will be apparent, therefore, that the motor 17 constitutes the source of power from which the wildcats 7, 7 may be actuated through intervening spur gears and pinions, and that the pins 9, 9 and the immediately associated elements constitute manually actuated clutches through the medium of which the said wildcat heads may be independently connected or disconnected from the source of power. It will be noted that bushings 27 are provided on the gudgeons 6 to constitute bearings for both the gears 8 and wildcat heads 7.

The gears 8 and wildcat heads 7 are confined on the gudgeon 6 by means in the present instance of a disk 28, the disks being mounted in each instance upon the outer reduced extremity 29 of the said gudgeons and being fixed thereon by means in the present instance of keys 31, these disks 28 being themselves held in place upon the said extremity 29 by means of plates 32 secured by screws 33 to the end surface of the gudgeon.

Figure 3:
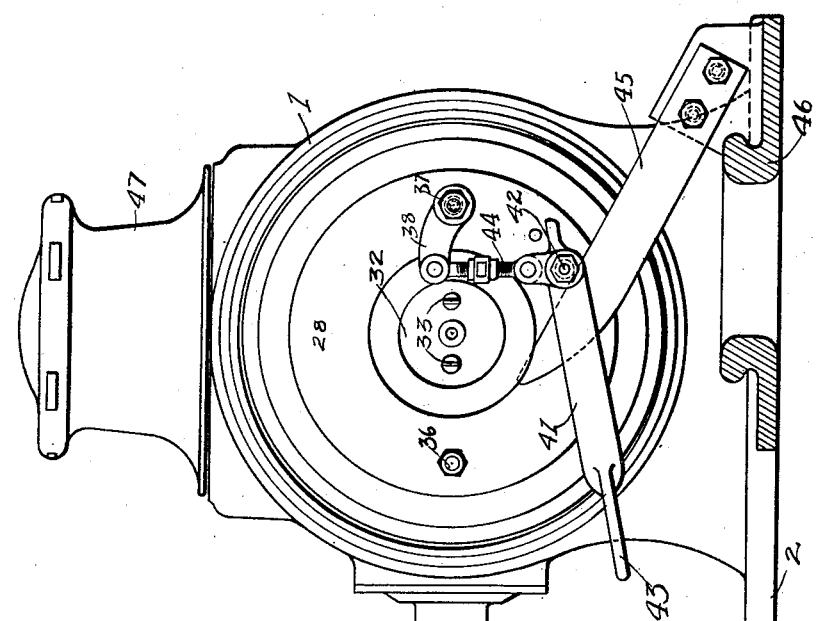
Fig. 3 is an end elevation of the assembly.
Figure 4:
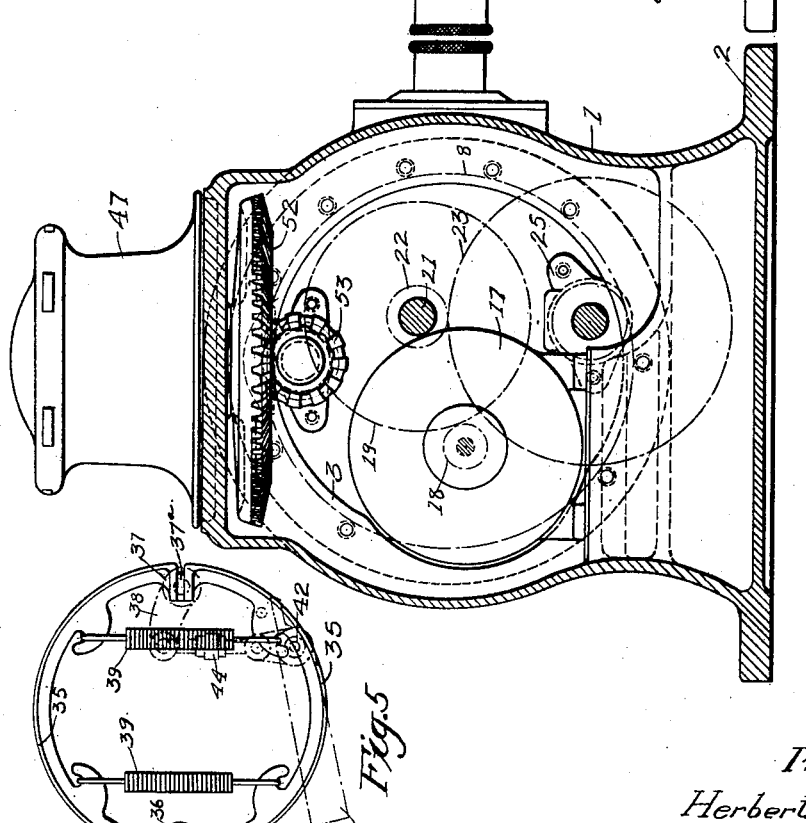
Fig. 4 is a transverse section on the line 4—4, Fig. 1.
Figure 5:
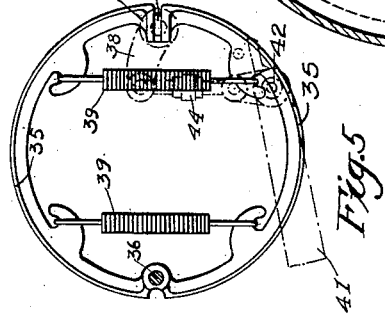
Fig. 5 is a detached elevational view illustrating the details of the brake mechanism.

As shown in Fig. 1, the outer faces of the wildcats 7 are provided in each instance with a transversely projecting annular flange 34, the interior face of which constitutes a brake drum, a suitable brake being mounted in the space intervening between the disk 28 and the outer face of the wildcat head and being mounted on the said disk 28. The details of this brake are shown in Fig. 5, it consisting in a preferred form of a pair of semicircular brake shoes 35 pivotally anchored through the medium of a pin 36 projecting inwardly from the inner face of the disk 28. The other end faces of the shoes 35 lie, as clearly illustrated, closely adjacent to each other and are separated by a cam 37a, see Fig. 5, upon one end of a pin or shaft 37 which is journaled in the disk 28 and which has attached thereto externally of said disk an arm 38, see Fig. 3, by means of which the said pin 37 may be rotated to actuate the cam 36. The cam 37a is adapted to separate the adjacent ends and to thereby spread apart the shoes 35 which have secured to their outer faces in well known manner a suitable brake lining material which with the expansion of the shoes is brought into frictional engagement with the inner face of the flange 34. The shoes 35 are normally held in a contracted relation clear of the brake drum by means of springs 39, 39, as clearly shown in Fig. 5.

The lever arm 38 is actuated to rotate the shaft 37 to apply the brake as previously described through a bell crank lever 41 pivotally mounted at 42 upon the disk 28, one end of this lever 41 having a flat extension 43 constituting a treadle, while the other is connected through an adjustable link 44 with the end of the lever arm 38. The arrangement is such that the short arm of the lever 41 and the link 44 connected thereto constitute in effect a toggle enabling a considerable braking force to be applied through the brake mechanism described above by a relatively slight pressure upon the treadle 43.

Each of the wildcat heads is provided with the usual stripper arm 45 which in the present instance is secured to a port rim or ring 46 adapted to be secured to the deck or other supporting surface immediately below the said wildcat heads in well known manner.

In addition to the wildcat heads and associated mechanism described above, the machine in its present form comprises a vertical gypsey head 47 at the top which is keyed to the top of a shaft 49 journaled in a vertical bearing 51 in the top of the housing 1, a bolt 48 also securing the said head to the upper end of the shaft. The gypsey head 47 rests upon the top of the boss which constitutes the bearing 51, as illustrated in Fig. 1, and the shaft 49 has secured to the inner end thereof a bevel gear 52 which meshes with a bevel pinion 53 on a shaft 54 journaled in the head 5, said shaft having at its outer end a pinion 55 meshing with the internal gear 8 at that end of the housing. In this manner, the vertical gypsey head 47 is actuated from the motor 17 which as previously described also actuates the wildcats. It will be noted that the housing 1 is so formed at the top as to slope away from the gypsey head towards the ends of the housing, and that the line of this sloping or tapered housing is continued through the locking disk 13. It will further be noted that the outer edge of the locking disk 13 is flanged so as to slightly overlap the inner edge of the wildcat heads, and that by securing the heads 4 and 5 in the housing at a point inside the extremities thereof the housing is made to extend over and protect that portion of the transmission which lies externally of the heads 4 and 5.

In the foregoing mechanism, I have provided an extremely compact, relatively simple and highly efficient machine particularly well adapted by reason of its compact form and unobtrusive appearance for use on yachts and other boats. The machine is desirable for this purpose also by reason of the water-tight housing provided for the motor 17. The simplicity of the construction is materially increased by the method of mounting the horizontal rotary heads upon fixed gudgeons constituting integral parts of the end plates 4 and 5 of the housing. A considerable mechanical advantage is also obtained through the use of spur or helical gears for directly connecting the horizontal rotary heads with the motor 17.

It will be apparent that the machine is capable of considerable modification without departure from the invention. The same essential construction for example may be used with horizontal gypsey heads replacing the wildcats shown in the illustrated embodiment, and the gypsey at the top of the housing may be replaced, if found desirable, by one or more bollards constituting an integral part, or otherwise, of the housing 1.

There may be modification in other details without departure from the invention.

I claim:

1. In a windlass or the like, the combination with a housing, of end plates secured in and closing the ends of said housing, said housing having end portions projecting outwardly beyond said plates, cylindrical extensions on said plates, rotary heads journaled on said extensions, a motor in the interior of the housing, and transmission gearing connecting the motor with the said rotary heads and including elements located in the space between the housing end plates and said rotary heads and enclosed by the projecting extremities of the housing.

2. In a windless or like machine, the combination with a substantially cylindrical housing having on the inner side thereof and inwardly of each extremity an annular flange, of end plates secured to said flanges and having gudgeons projecting outwardly beyond the overhanging ends of said housing, rotary heads journaled on said gudgeons, a motor in the interior of the housing, and transmission gearing connecting said motor with the said rotary heads and including elements located in the space between the housing end plates and the rotary heads and surrounded by the extreme portions of the housing.

3. In a windless or like machine, the combination with an open-ended housing, of a motor mounted in the interior of said housing, housing end plates secured in the opposite ends of the housing and encasing said motor, a shaft journaled in the end plates and projecting therethrough, gearing connecting the said shaft with the motor, a rotary head mounted at each end of the housing, and gearing connecting said rotary heads with the outwardly projecting ends of said shaft.

4. In a windlass or like machine, the combination with a housing closed at one end, of an end plate secured in and closing the other end of said housing, an integral gudgeon projecting from said end plate, a rotary head journaled on said gudgeon, a motor mounted in the housing and operatively connected with said rotary head, and a brake cooperative with said rotary head and mounted on said gudgeon.

5. In a windless or like machine, the combination with a housing, of an end plate secured in and closing one end of the housing and having an outwardly extending horizontal gudgeon, an internal gear journaled on said gudgeon, a rotary head also journaled on said gudgeon, means for connecting said gear and head, a vertical rotary head mounted on the top of said housing and also operatively connected with said gear, a motor mounted in the interior of the housing, and transmission mechanism connecting the motor with said internal gear.

6. In a windlass or like machine, the combination with a housing, of an end plate secured in and closing one end of the housing and having an outwardly extending horizontal gudgeon, a gear journaled on said gudgeon, a rotary head also journaled on said gudgeon, and means for operatively connecting and disconnecting said gear and head including an element journaled concentrically upon said gear.

7. In a windlass or like machine, the combination with a housing, of an end plate secured in and closing one end of the housing and having an outwardly extending horizontal gudgeon, a gear journaled on said gudgeon within the end of said housing, a rotary head also journaled on said gudgeon and spaced from the end of said housing, and manually-actuated means projecting into the space between the end of the housing and the rotary head for operatively connecting and disconnecting the said head with the gear.

8. In a windlass or like machine, the combination with a housing, of an end plate secured in and closing one end of the housing and having an outwardly extending horizontal gudgeon, an internal gear journaled on said gudgeon adjacent the end plate, a rotary head also journaled on said gudgeon, releasable means for connecting said gear and head, a vertical rotary head mounted on the top of said housing, a motor mounted in the interior of the housing, and transmission mechanism including said internal gear for connecting the vertical rotary head with the motor.

9. In a windlass or like machine, the combination with a substantially barrel-shaped housing, of an end plate secured in and closing one end of the housing and having an outwardly extending horizontal gudgeon, a gear journaled on said gudgeon, a rotary head also journaled on said gudgeon, an element axially slidable in said gear for operatively connecting the gear with the rotary head, an actuating member journaled concentrically on said gear, and a cam connection between said member and the locking element for adjusting the element to connect and disconnect the gear and the said head, a motor in said housing, and transmission means connecting the motor with said gear.

10. In a windlass or the like, the combination with a substantially cylindrical housing, of end plates secured in and closing the ends of said housing, said housing having end portions projecting outwardly beyond said plates, cylindrical extensions on said plates, rotary heads journaled on said extensions, a motor in the interior of the housing, and transmission gearing connecting the motor with the said rotary heads and including elements both interior and exterior of the end plates, the exterior elements being located within the space between the end plates and said rotary heads and being enclosed by the projecting extremities of the housing.

HERBERT ALLEN PECK.